(12) United States Patent
Parks

(10) Patent No.: US 11,377,794 B2
(45) Date of Patent: Jul. 5, 2022

(54) PULP WASHER MIST ELIMINATOR AND FOAM REMOVER SYSTEM

(71) Applicant: Clinton R. Parks, Loveland, OH (US)

(72) Inventor: Clinton R. Parks, Loveland, OH (US)

( * ) Notice: Subject to any disclaimer, the term of this patent is extended or adjusted under 35 U.S.C. 154(b) by 0 days.

(21) Appl. No.: 16/770,008

(22) PCT Filed: Jun. 18, 2019

(86) PCT No.: PCT/US2019/014146
§ 371 (c)(1),
(2) Date: Jun. 4, 2020

(87) PCT Pub. No.: WO2019/113609
PCT Pub. Date: Jun. 13, 2019

(65) Prior Publication Data
US 2021/0238803 A1    Aug. 5, 2021

Related U.S. Application Data

(60) Provisional application No. 62/594,327, filed on Dec. 4, 2017.

(51) Int. Cl.
*D21F 1/34* (2006.01)
*D21F 1/02* (2006.01)
*D21F 1/52* (2006.01)

(52) U.S. Cl.
CPC ............. *D21F 1/345* (2013.01); *D21F 1/024* (2013.01); *D21F 1/526* (2013.01)

(58) Field of Classification Search
CPC ... D21D 5/02; D21D 5/00; D21C 9/02; D21C 9/00; B04C 3/06; B04C 3/00;
(Continued)

(56) References Cited

U.S. PATENT DOCUMENTS 6,139,806 A * 10/2000 Nickens ................. B01D 47/10
422/168
6,630,014 B1 * 10/2003 Parks ...................... B01D 45/12
95/269

(Continued)

OTHER PUBLICATIONS

International Application No. PCT/US2019/014146, International Search Report dated Apr. 12, 2019, 13 pages.

*Primary Examiner* — Eric Hug
*Assistant Examiner* — Matthew M Eslami
(74) *Attorney, Agent, or Firm* — David Lee Narciso

(57) ABSTRACT

Method and apparatus for removing liquid from a gas/liquid flow for use in pulp washers, deinking cells, and the like are disclosed. A gas/liquid separator includes a separation chamber with a flow director providing a gas/liquid flow from a receptacle into the separator in a direction causing impingement of entrained liquid particles on a chamber wall such that liquid particles coalesce into liquid droplets that travel downward by the force of gravity to a separated liquid drain and drained outside the receptacle. A tangential flow inlet provides greater impingement than a cyclonic flow introduced at the lower end of the gas/liquid separator in initially directed upwards. Separated liquid could further be taken outside the pulp washer system for further processing or disposal based on the chemical content of the separated liquid.

17 Claims, 12 Drawing Sheets

(58) Field of Classification Search
CPC ........ B01D 53/24; B01D 53/00; B01D 45/16; B01D 45/12; B01D 45/00
See application file for complete search history.

(56) References Cited

U.S. PATENT DOCUMENTS

| | | |
|---|---|---|
| 6,719,829 B1 | 4/2004 | Schwab |
| 2001/0005986 A1* | 7/2001 | Matsubara .............. B04C 5/103 55/459.1 |
| 2003/0221398 A1 | 12/2003 | Trautmann et al. |
| 2010/0200521 A1* | 8/2010 | Sarshar .................... B04C 3/06 210/787 |
| 2014/0251140 A1 | 9/2014 | Sams et al. |
| 2016/0032720 A1* | 2/2016 | Schexnaider ........... E21B 43/34 95/258 |

* cited by examiner

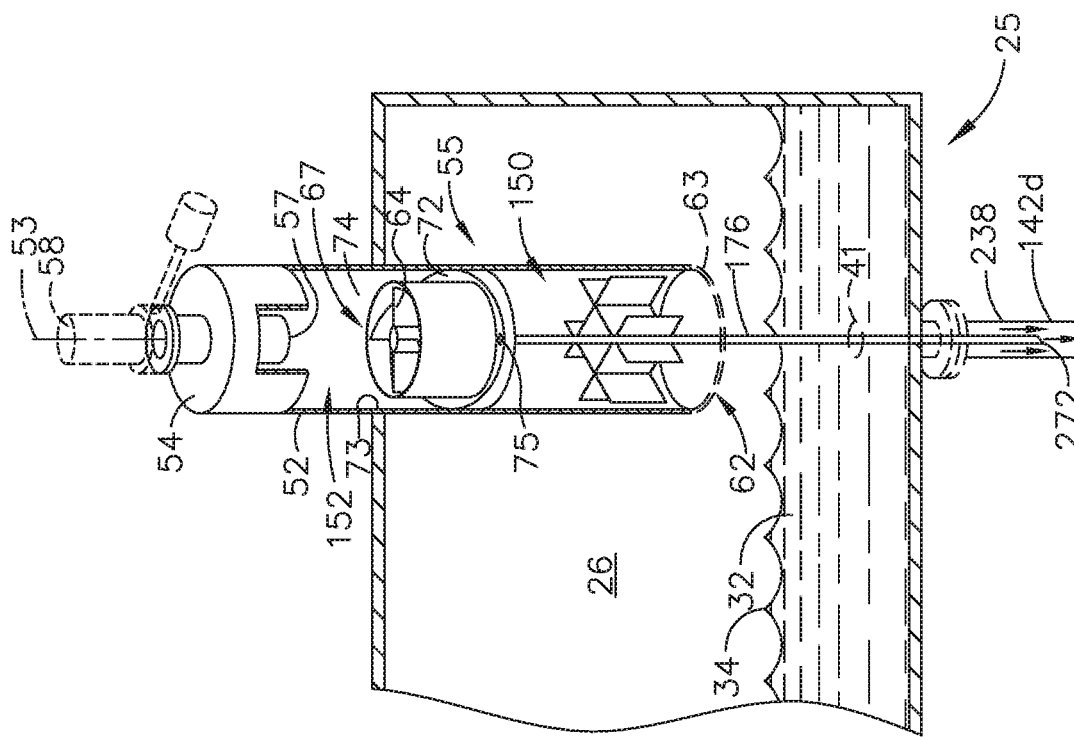

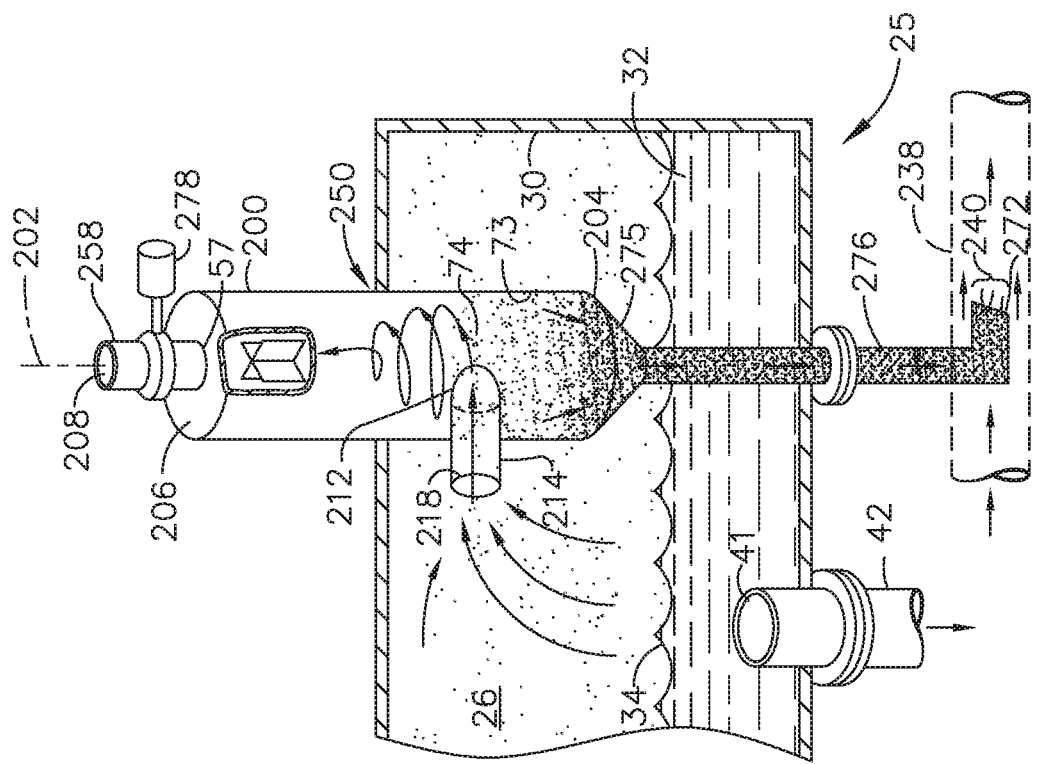
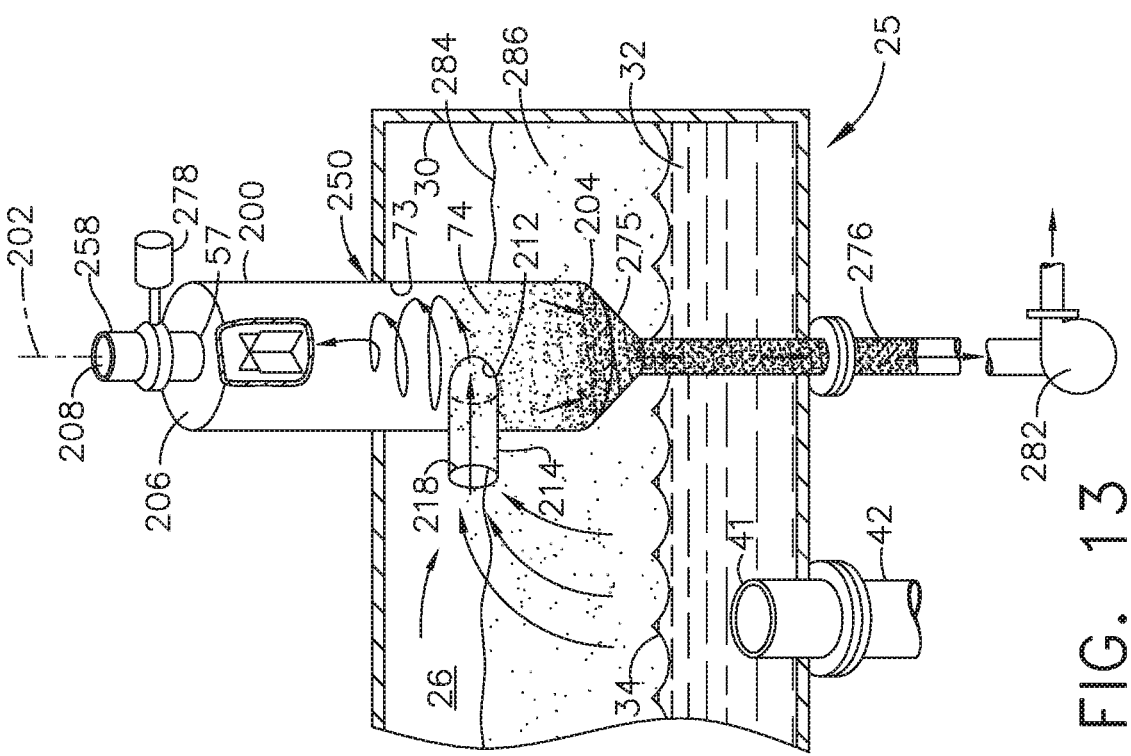
FIG. 14
FIG. 13

PULP WASHER MIST ELIMINATOR AND FOAM REMOVER SYSTEM

TECHNICAL FIELD

The present invention relates to an apparatus for the separation of gas and liquid from a flowing mixture of gas and liquid, and more particularly to a gas/liquid separator for use in a cellulose pulp washer.

BACKGROUND

In preparation of cellulose pulp, used in the preparation of paper products, wood chips are digested at high temperatures using various starting pulping liquors, such as an alkaline solution including sodium hydroxide and sodium sulfide as "cooking chemicals" referred to as a white liquor. Substances binding cellulose fibers are dissolved in the pulping liquor in the digestion process. The resulting pulping liquor contains "dissolved solids" including the dissolved wood substances and cooking chemicals. For example, the liquor resulting from a digestor using white liquor is dark in color and the liquid portion is referred to as a black liquor, which is recovered for processing to recover heat values, cooking chemicals, and/or by-products suitable for sale. Other solutions produce different pulping liquors, but the principle is the same. The pulp fibers must generally be freed of the spent liquor to produce paper products. It is desirable to recover the spent liquor at as high a concentration of dissolved solids as possible since further processing to recover heat values, cooking chemicals, and/or by-products suitable for sale generally involves as a first step the concentration of liquor. It is desirable to use a minimum quantity of wash liquid to achieve a desired washing efficiency because the wash liquid dilutes the recovered liquor and adds to the cost to concentrate the liquor in the recovery process, such as by evaporation when using water as the initial wash liquid. The term "liquid" as used herein is not meant to be limited to pulping liquors and/or water, but can include any fluid in liquid form, including particles of liquid that may be suspended in gas, and particularly any liquid that is used as a wash liquid for digested pulp.

One advantageous method of washing wood pulp draws air from over a reservoir of pulping liquor by means of a vacuum provided by a blower intake, such as a fan. The air is usually drawn through the blower and provided under pressure to a portion of an apparatus, such as a pulp washer, to create a region of positive pressure. However, the air drawn by the vacuum created by the blower may have liquid or solid particles entrained therein, particularly where the liquid has foam or froth covering its surface. For proper operation of the blower and the apparatus, it is necessary to separate the entrained particles from the air before the air reaches the blower. Throughout this specification the term "vacuum" is defined, in its more general industrial usage, as a degree of rarefaction below ambient pressure or when used in relation to a particular location, a local relative pressure. In this way the term vacuum is not limited to mean a space devoid of matter either in absolute terms or to the highest possible degree by artificial means, but rather, using a term common to the scientific arts, a partial vacuum. Therefore, throughout this specification "draw a vacuum", "a vacuum", "under vacuum" and "vacuum level" describe relative pressure actions or conditions against a pressure at a reference point understood by the contextual use of the term. Likewise, the terms "vacuum source" and "vacuum pump" mean devices that are configured and arranged within a system to locally reduce pressure of that system relative to another relative point of that system understood from the usage context of the term.

Various means of separating a gas from a gas/liquid flow mixture are known in the art, while a typical pulp washer may use a cyclonic separator. In a typical cyclonic gas/liquid separator, also referred to as a mist eliminator, a gas mixture having particles entrained therein is drawn vertically upward. A cyclonic rotation is imparted to the flowing mixture, typically by means of helical or spiral vanes. Centrifugal force causes heavier particles to be forced radially outwardly toward the outer periphery of the flow mixture where the particles coalesce into liquid droplets and drop back downward under the force of gravity. The gas mixture without the heavier liquid particles continues upwardly.

Mist eliminators may be used in a flat bed wood pulp washer generally similar in construction and mode of operation to a Fourdrinier paper machine incorporating an endless foraminous belt ("wire"), a headbox which delivers the pulp suspension in a pulping liquor to one end of a horizontally traveling upper run of the wire, successive washing zones along the length of the run, and means at the downstream end of the run for receiving and removing the resulting washed pulp. Pulp washers of this type and incorporating features taught by U.S. Pat. No. 4,154,644 to Ericsson are commonly referred to as "Ericsson washers", and the present invention was developed to improve the operation and results obtained by such pulp washers.

The operation of a pulp washer of this type may be described as being according to the displacement washing principle. That is, once the pulp mat has been formed, it is not rediluted, but simply is subjected to repeated washings by application on top of the mat of washing liquid with the liquid applied in each washing zone having a lower concentration of liquor than the filtrate from the preceding zone. The liquid applied in each zone enters the mat substantially en masse and thereby displaces the liquid which was carried into the zone in the mat and causes it to drain therefrom through the wire.

The mechanical elements of a washer according to the Ericsson patent include a hood which encloses the entire apparatus downstream from the headbox, and a series of receptacles below the operating run of the wire in sealed relation with the hood. In operation, vacuum is applied to the receptacles, and/or gas pressure is developed within the hood, to augment the action of gravity in forcing the washing liquid through the pulp mat on the wire. Gases and vapors drawn through the wire into the upper spaces in the receptacles are recycled back to the hood to increase the pressure differential above and below the wire.

In the pulp washer, a mist eliminator is attached to each of the receptacles at a gas outlet on top of the receptacle to thereby permit the gases and vapors to be drawn from the flat top receptacles through the mist eliminator to the suction side of a pump or fan (such as a blower) that recycles the gas, in this case air, to the hood. However, entrained within the gases and vapors drawn from the receptacle are particles of mist and foam from the space between the wire and the pulping liquor.

Mist eliminators have been used to remove particles of mist and foam from the gas flow before the gas reaches the pump or blower. The typical mist eliminator has a cylindrical housing arranged vertically proximate the top of the receptacle with a vacuum line attached to the top end. The gas inlet is positioned above the level of the liquor with cyclonic-flow-inducing means, typically helical vanes or a swirler, positioned within the inlet. Droplets of mist and particles of foam are hurled radially outwardly by centrifugal force from the gas/liquid flow to drop back down into the liquor under the force of gravity.

The upward draft of gas through the mist eliminator impinges upon the falling, separated liquid droplets, retarding the separation of undesired droplets of mist and particles of foam entrained within the gas flow. Thus, incomplete separation of foreign matter from the gas results. Mist and foam entrained within the gas flow result in a contaminated airflow reaching the blower, severely impeding its performance and resulting in a lower pressure differential being developed between the hood and the receptacle, reducing the efficiency of the pulp washer. U.S. Pat. No. 6,190,438 to Parks (hereinafter '438), the disclosure of which is incorporated herein by reference, provided an improvement using an annular zone formed in the separator where falling droplets of separated water and liquid drain downwardly in the device substantially without resistance from countercurrent flow of gas and liquid, including draining the separated liquid through a tube to a point below the surface of the liquor. In some instances, where dense foams were encountered in the suction box, turbulence was actually increased in the liquid directly beneath the separator, leading to inefficient separation. U.S. Pat. No. 6,630,014 to Parks (hereinafter, '014), the disclosure of which is incorporated herein by reference, sought to address this problem by adding a second cyclonic action zone to enhance the separation of liquid components from the gas component of the flow through the separator.

Misting and foaming is sometimes beyond the efficiency provided by the above described liquid gas separators resulting in liquid reaching and damaging the fan and/or deleteriously affecting the atmosphere above the wire. Accordingly, there is a need for an improved mist eliminator and foam remover system in a pulp washer.

SUMMARY

A pulp washer includes a mist eliminator and foam remover system using a gas/liquid separator providing a vacuum to a suction box receptacle to remove separated liquid outside the receptacle. The gas/liquid separator is positioned proximate to a suction box with a gas/liquid inlet for receiving and separating a mixture of gas and liquid from the atmosphere above pulping liquor in the receptacle. The gas/liquid separator has a housing including a wall extending around a generally longitudinally extending substantially vertical centerline with an upper and a lower end disposed at opposite ends of the housing. A vacuum source is provided in flow communication with the upper end of the gas/liquid separator and a separation chamber is provided between the upper and lower ends of the housing with a flow director providing gas/liquid flow entering the separation chamber in a direction not parallel to the centerline of the housing such that when a suction is drawn by the vacuum source, a mixture of gas and liquid particles is drawn into the gas/liquid inlet and directed into the separation chamber with the velocity and momentum of the liquid particles causing impingement on the wall of the separation chamber, coalescing the liquid particles into droplets which drain down the chamber walls by the force of gravity to a liquid drain connected to a drain tube that extends from the housing to a drain tube end outside the suction box. The housing can be cylindrical and have a cyclonic flow inducing vane assembly as a flow director to induce an upward flow from the lower end of the housing into a cyclonic flow entering the separation chamber forcing the liquid particles outward to the chamber wall, or the housing can have a tangential entry where the flow director is a flow passage having a centerline oriented substantially transverse to and offset from the vertical centerline, the flow passage leading from the gas/liquid inlet to a chamber inlet formed in the housing wall. The tangential entry provides a higher velocity towards the wall of the chamber with very little upward flow at the initial entry point. Draining of the separated liquid can be augmented by a vacuum source to the separated liquid drain line, such as an eductor or a liquid vacuum pump.

A method for separating liquids from a liquid and gas flow stream in a counter-current pulp washer uses a gas/liquid separator with a housing having a wall extending around a generally longitudinally extending substantially vertical centerline with a lower end and an upper end disposed at opposing ends of the housing, the upper end adapted to provide a gas outlet in flow communication with a gas vacuum source. A separation chamber is located between the upper and lower ends and includes a chamber inlet in flow communication with a suction box receptacle and a chamber outlet in flow communication with the gas outlet. The separation chamber has a chamber wall substantially aligned with the vertical centerline, and a flow director provides a flow through the chamber inlet in a direction not parallel to the vertical centerline. The method includes drawing a suction from a gas vacuum source to the gas outlet such that in turn a gas/liquid flow is drawn into the separation chamber from the suction box receptacle in a flow-wise direction not aligned with the vertical centerline and entrained particles have a velocity and momentum causing impingement on the chamber wall where the particles coalesce into droplets of separated liquid and travel downward by the force of gravity to a separated liquid drain and drained outside the receptacle. Drainage of separated liquid may be augmented by a liquid vacuum source. Such drainage may join a pulping liquor flow to an upstream liquid shower. Drainage of separated liquid may also be removed from the pulp washer for further processing.

Another embodiment of a pulp washer includes a mist eliminator and foam remover system using a gas/liquid separator positioned proximate a suction box receptacle and with a gas/liquid inlet in flow communication with the suction box above a pulping liquor level in the suction box. The gas/liquid separator has a gas outlet in flow communication with a gas vacuum source such that in operation gas is pulled through the gas/liquid separator from the suction box. The gas/liquid separator has a housing with a wall extending around a generally longitudinally extending substantially vertical centerline with an upper and a lower end disposed at opposite ends of the housing. The lower end has a separated liquid drain with a drain tube extending from the housing, and the upper end is adapted to provide the gas outlet. A separation chamber is located between the lower end and the upper end with a chamber wall substantially aligned with the housing centerline, the chamber wall internal to the housing wall. A chamber inlet is provided in the housing wall with a flow passage have a centerline oriented substantially transverse to and offset from the vertical centerline, the flow passage extending outward from the chamber inlet to the gas/liquid inlet. The flow passage can have varying shapes and cross-sectional sizes, entry shapes, and angles with respect to the housing centerline. In operation, the gas vacuum source draws a mixture of gas and liquid particles through the gas/liquid inlet and directed into the separation chamber at an angles such that the velocity and momentum of the liquid particles causes impingement on the wall of the separation chamber, coalescing the liquid particles into droplets which drain down the chamber walls by the force of gravity to the separated liquid drain. The drain tube can extend below the pulping liquor level or outside the suction box where draining of the separated liquid can be augmented by a vacuum source to the drain tube, such as an eductor or a liquid vacuum pump.

A deinking cell includes a receptacle for holding a fiber containing slurry, an agitator for agitating the slurry such that in operation a foamy mass containing ink particles is generated and floats on top of the fiber containing slurry with a foam level, and a gas/liquid separator having a gas outlet in flow communication with a gas vacuum source. The deinking cell further includes a gas/liquid separator positioned proximate the receptacle and having the features of the gas/liquid separators described above with the separated liquid drain extending outside the receptacle such that in operation separated liquid containing ink particles enable removal of ink from the fiber containing slurry.

BRIEF DESCRIPTION OF THE DRAWINGS

The accompanying drawings, which are incorporated in and constitute a part of this specification, illustrate embodiments of the invention and together with the detailed description given below, serve to explain various aspects of the invention.

FIG. 6 is a partially broken away side elevational view of an embodiment of a mist eliminator and foam remover system draining liquid outside the receptacle.

FIG. 7 is a partially broken away side elevational view of a mist eliminator and foam remover system using an eductor.

FIG. 13 is a view in side elevation of an embodiment of a tangential entry mist eliminator and foam removal system having a drain connection to a vacuum source.

FIG. 14 him is a view in side elevation of an embodiment of a tangential entry mist eliminator and foam removal system having a drain augmented by an eductor.

DETAILED DESCRIPTION

Figure 1:
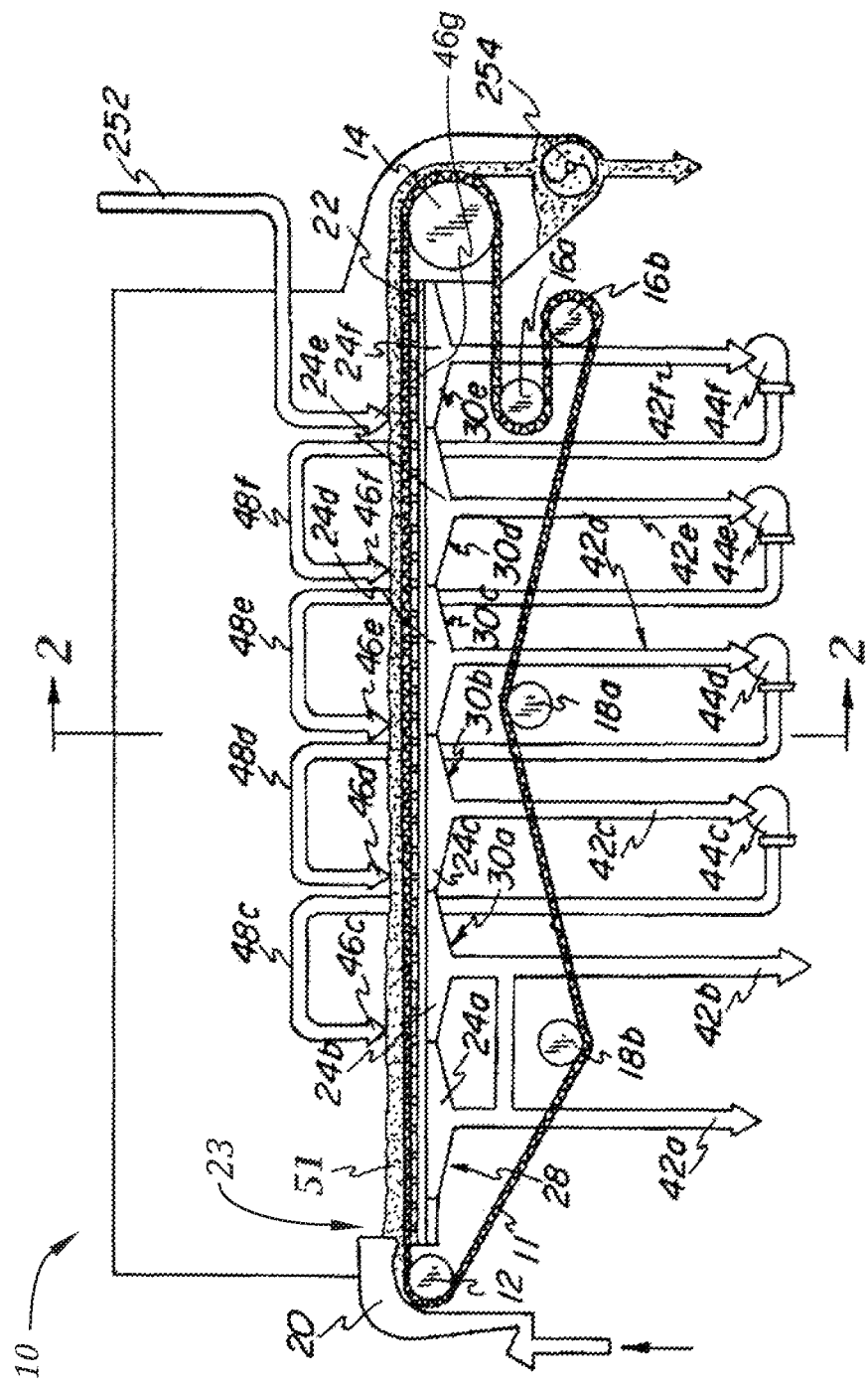
FIG. 1 is a diagrammatic view in side elevation representing a horizontal pulp washer that may incorporate improvements in accordance with the invention.

FIG. 1 diagrammatically depicts an Ericsson type pulp washer 10 as taught in the '438 patent in which the mist eliminator and foam remover system of the present invention may be used. An endless foraminous belt 11, usually a wire of woven plastic filaments, is trained around a breast roll 12 at the upstream wire run location, a couch roll 14 at the downstream run location and around drive rolls 16a, 16b, and tensioning rolls 18a, 18b on the return run of the belt to the upstream location 23. A headbox 20 deposits a pulp suspension to be washed onto the upstream end of the wire run. A smooth, foraminous material 22 of low frictional coefficient such as a perforated polyethylene sheet is provided below and in supporting relation to the upper run of the wire 11. Disposed directly underneath the sheet and mounted on a frame (not shown) are a plurality of receptacles 24a-24f Each of these is, in effect, a suction box, bounded at the top by the perforated sheet 22. As more fully explained in the Ericsson patent, the receptacles 24a-24f are interconnected and operated so that they form a series of successive zones along the path of the wire run comprising a formation zone 28 adjacent the headbox 20 and consecutive washing zones 30a-30e, the last of which 30e is adjacent the downstream end of the wire run.

A hood 40 is supported by a frame (not shown) and is positioned in enclosing relationship to the zones 28 and 30a-30e. As more clearly shown in FIG. 2, the hood provides a seal over the receptacles 24a-24f.

Turning back to FIG. 1, each of the receptacles is provided with a drain line 42a-f. Drain lines 42c-f communicate with pumps 44c-f to return liquid to shower heads 46c-f through liquid return lines 48c-f to provide wash liquid to effect displacement washing of the mat 51 of fibers as it travels from the upstream to downstream direction along the upper run of the wire 11. Clean water or white water is passed through line 252 so that the pulp mat adjacent the couch roll is washed with relatively clean water that drains through the wire into receptacle 24f with dissolved wood substances and spent chemicals as a weak pulping liquor. The washed pulp after leaving washing zone 30e exits the device via the assistance of auger 254. As noted above, the liquid from each receptacle is provided to the upstream showerhead resulting in stronger liquors at each successive receptacle. Pulping liquor drained from receptacle 24b through drain line 42b is forwarded to an evaporator tank, with pulping liquor drained from upstream receptacle 42a forwarded to a blow tank (not shown). Lines 42a and 42b are connected via valve (not shown) so that pulping liquor from line 42a may be directed to the evaporator if desired and, conversely pulping liquor from line 42b could, if desired, be channeled to the blow tank.

In simplified form, the apparatus of FIG. 1 serves to evenly distribute pulp fed from the headbox onto the moving wire. In the formation zone 28, pulp is dewatered from inlet consistency to displacement consistency, forming a pulp mat. Receptacles 24a-e serve as suction boxes under the wire to collect the liquid passing therethrough.

Displacement washing of the mat occurs when the mat goes under the shower where the filtrate from each succeeding washing stage flows onto and through the pulp. The device depicted in FIG. 1 employs multiple stages of displacement washing, the number of which will depend on the finish and the washing efficiency required. Dewatering and displacement of shower liquid is a function of the arrangement of the receptacle (suction box) pumps and a blower (explained thereinafter) and the hood.

Figure 2:
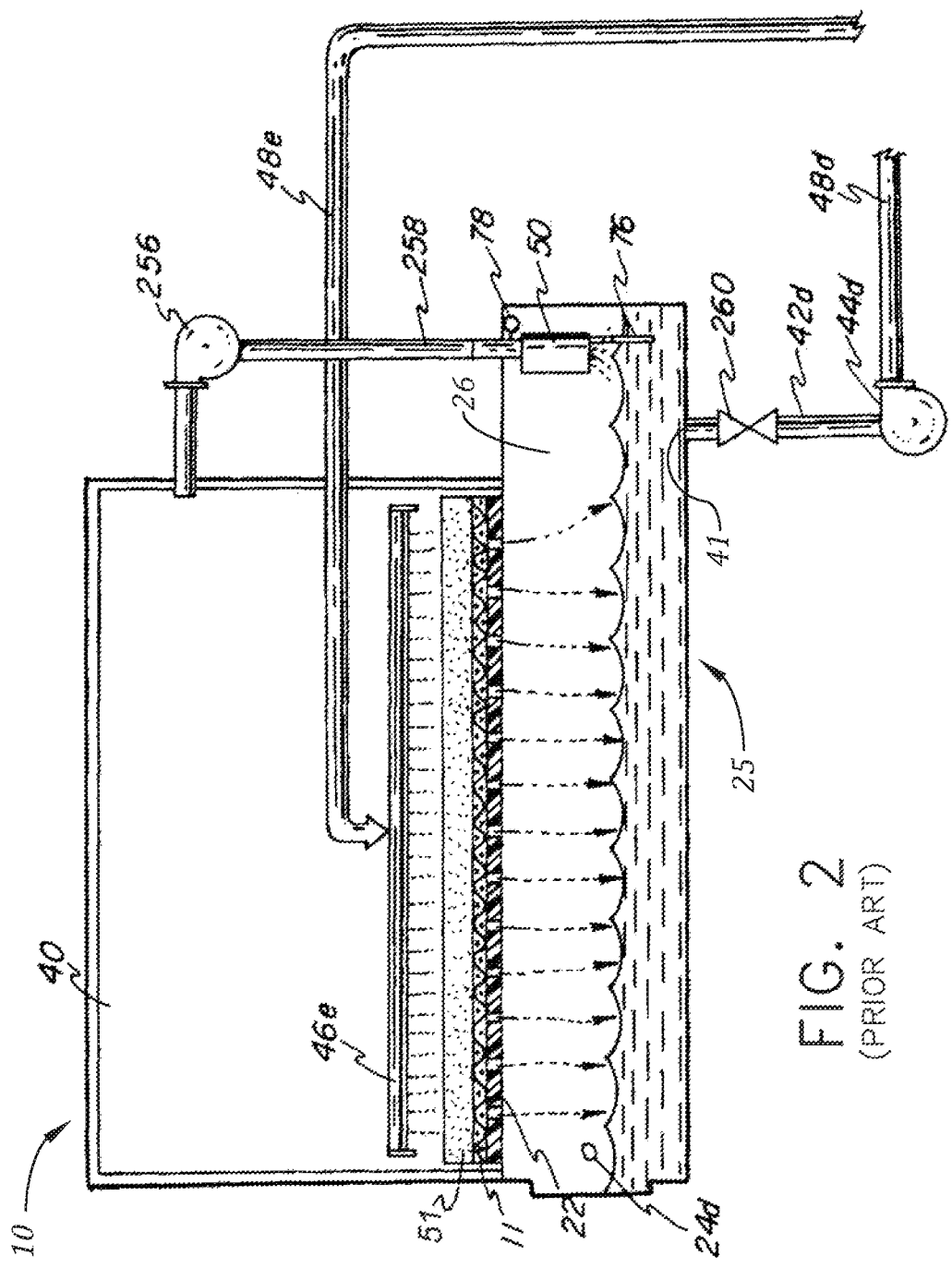
FIG. 2 is a cross-sectional view taken along the lines and arrows 2-2 of FIG. 1 and detailing the system location of an exemplary mist eliminator in a receptacle.

Turning now to FIG. 2 it can be seen that gas (usually air) is provided to the hood by means of blower 256 which in turn is the gas vacuum source for the suction box. Air from each suction box is returned to the blower via line 258. A pressure differential (for example, between about 0.01 inch to about 4 inches Hg) is developed and maintained between the hood and the suction box atmosphere so that this pressure differential provides a driving force for the shower liquid to flow through the mat on the wire.

The hood maintains a seal between the atmosphere and the receptacle. The gauge value of the pressure in the hood may be positive, zero or negative depending on the desired washer operation. Filtrate from line 48e is used to provide wash liquid to shower head 46e. Filtrate from receptacle 24d is drained through line 42d where it is pumped by pump 44d to upstream shower head 46d (See FIG. 1). Line 42d is provided with a liquid level control valve 260 operatively associated with pump 44d to control the liquid level inside of the receptacle 24d. While this view in FIG. 2 is of washing zone 30c, all washing zones 30a through 30e may have analogous views and associated elements as depicted in FIG. 1 and further described below, the only difference being the last washing zone 30e, wherein the showerhead is supplied by line 252 with clean or white water (or other liquid as may be appropriate) rather than a downstream receptacle drainage.

Figure 3:
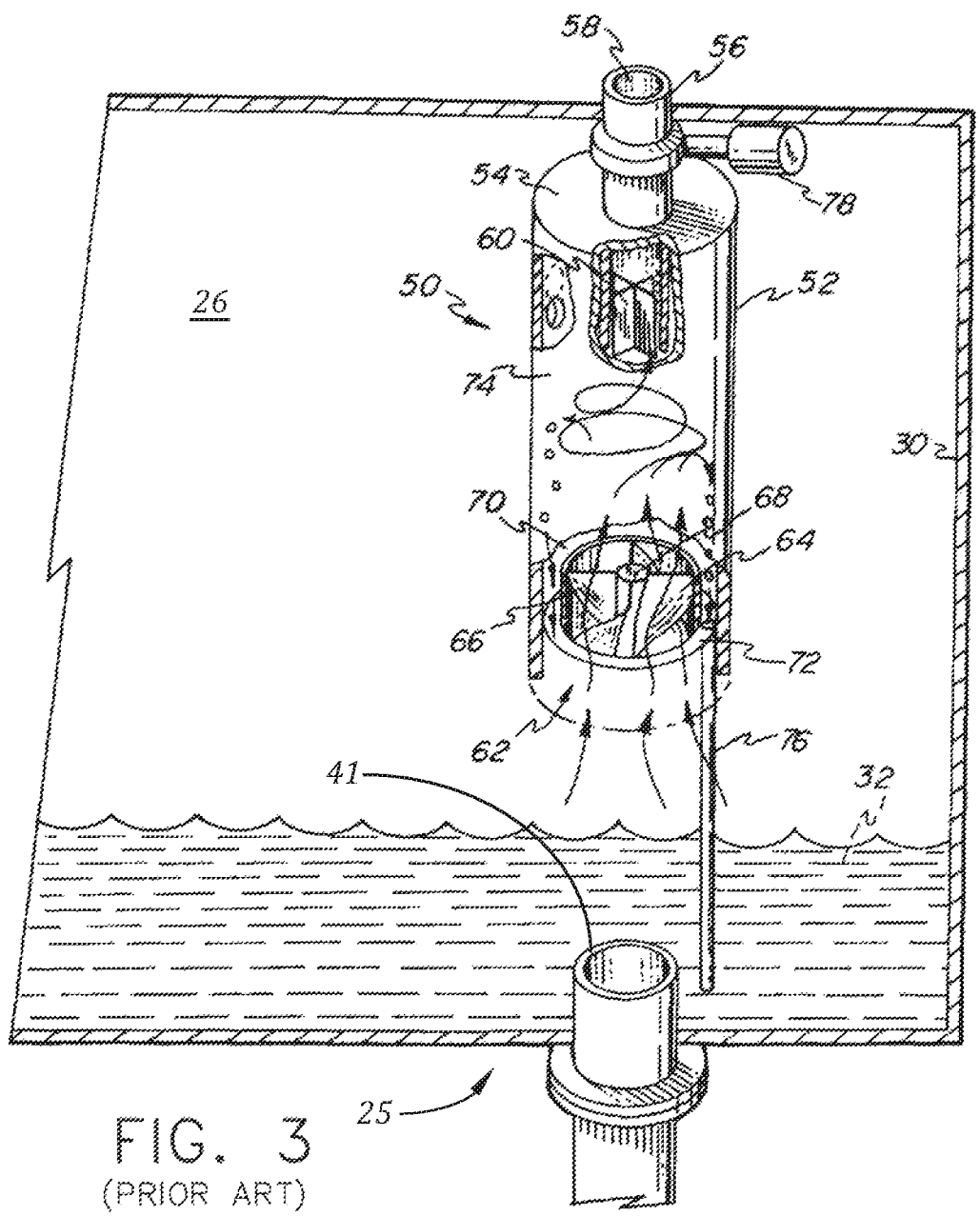
FIG. 3 is a partially broken away side elevation view of an embodiment of a prior art mist eliminator.
Figure 4:
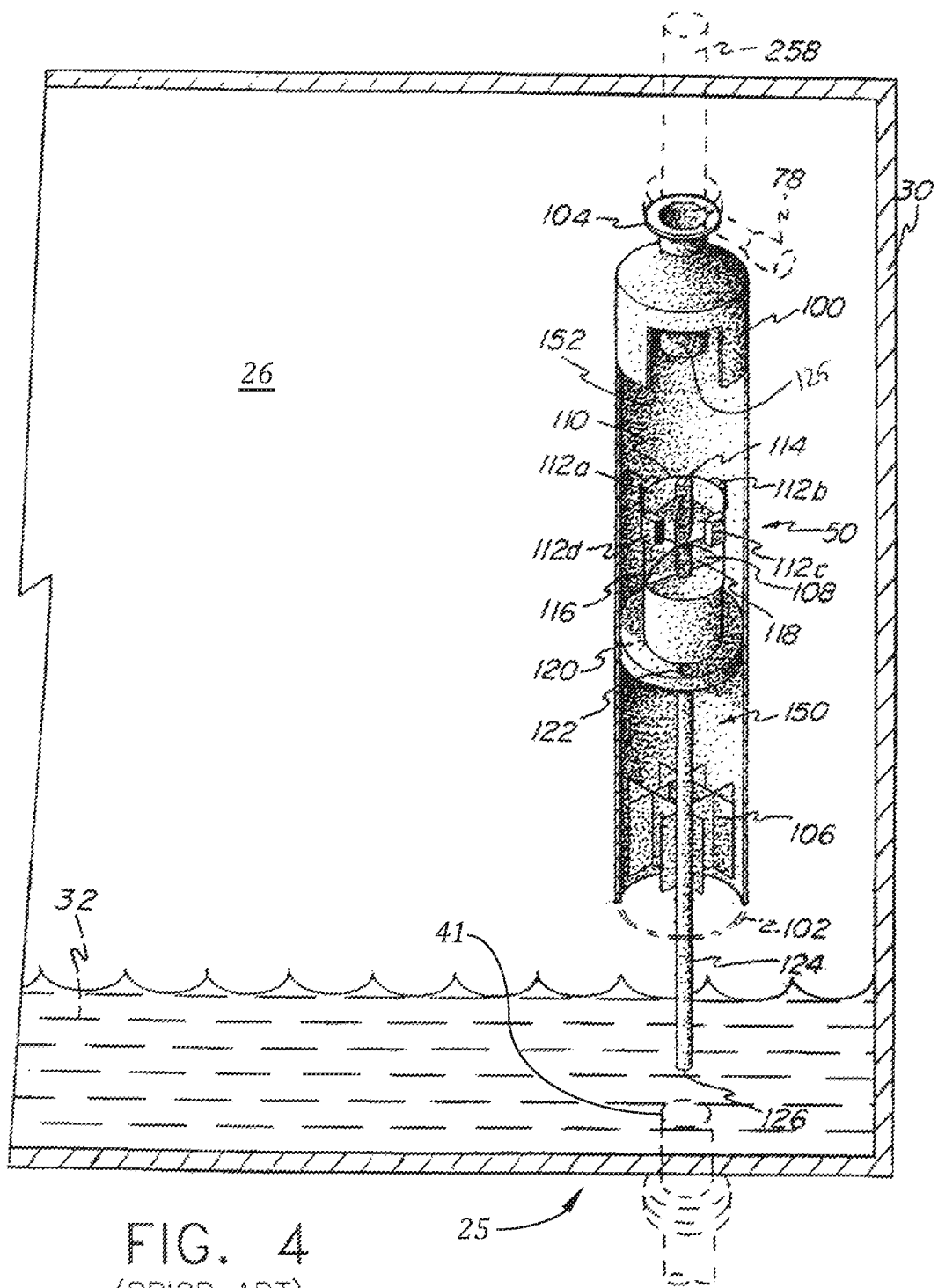
FIG. 4 is a partially broken away side elevational view of another prior art mist eliminator shown in its position in a suction box.

Disposed above the liquid level in receptacle 24d is a liquid/gas separator 50, also referred to as a mist eliminator, such as those depicted in FIG. 3 and FIG. 4, with drainage from the separator passing directly into the liquid in the receptacle 24d via a drain tube 76 in FIG. 3 and analogous drain tube 124 in FIG. 4. A valve 78 controls the flow of gas back to the suction side of blower 256.

Although separator 50 is shown mounted within receptacle 24d, it is to be appreciated that it could also be spaced closely adjacent to the receptacle 24d. The term proximate as used herein is intended to cover mounted arrangements where the separator is mounted in, contiguous to, or closely adjacent the receptacle or suction box 26 provided that it is located upstream from the control valve 78 that is used to regulate the fluid flow through the separator device.

The separator 50 serves to separate foam and liquid from the gas that is to be recycled to the hood by blower 256. Foam and liquid separation have become critically important as higher soap content pulps such as Southern Pine Kraft pulps are increasingly used and as washer throughput rates are increased.

FIG. 3 shows an exemplary mist eliminator, as taught in the '438 patent. In pertinent part, the mist eliminator 50 comprises a substantially cylindrical housing 52 having a top wall 54 at an upper end with an axial tube 56 defining a gas outlet 58 therein. Preferably, positioned within the tube 56 are flow-straightening baffles 60, although the baffles 60 may be omitted. The mist eliminator 50 is oriented vertically with a gas/liquid inlet 62 oriented downwardly. Positioned within the gas/liquid inlet 62 substantially coaxially with the tube 56 is a vane assembly 64 including at least one helical vane 66 surrounding a cylindrical core 68 and preferably bounded by a cylindrical wall 70 extending the axial length of the vane 66. The exact structure of the vane assembly is not crucial so long as it imparts cyclonic motion to a gas/liquid mixture drawn through it.

Annular wall 72 is coaxial with and transverse to the vane assembly 64. It surrounds the vane assembly 64 between the cylindrical wall 70 and the housing 52. The housing 52, top wall 54, vane assembly 64, and annular wall 72 define a separation chamber 74 with chamber inlet 67. Annular wall 72 includes at least one drain tube 76 extending axially away from annular wall 72 and extending from the separation chamber 74 to the pulping liquor 32 level. Preferably, annular wall 72 is inclined from horizontal about fifteen degrees with a single drain tube 76 positioned at the lowest point thereof.

The annular wall 72 is preferably dimensioned such that the wall 72, in combination with the housing 52, defines a substantially annular volume within the separation chamber 74 wherein droplets of mist and particles of foam separated from a gas/liquid mixture flowing from the inlet 62 to the outlet 58 may travel downwardly toward the annular wall 72 substantially without direct impingement thereon from the upwardly flowing gas mixture.

The mist eliminator 50 is shown mounted in a receptacle 30 of a pulp washer a predetermined distance above a reservoir of pulping liquor 32. In operation, the intake of a blower or fan (not shown) is connected to tube 56 to draw a vacuum on outlet 58. Air in the receptacle 30 above the pulping liquor 32, with mist and foam entrained therein, is drawn upwardly through gas/liquid inlet 62, vane assembly 64, separation chamber 74, and straightening baffles 60 to outlet 58. Vane assembly 64 imparts swirling cyclonic motion to the gas/liquid mixture flowing therethrough. The resultant centrifugal forces act upon the denser particles to cause the particles to travel radially outwardly toward the housing 52 as the swirling gas/liquid mixture spirals upwardly toward the tube 56.

As the particles thus acted upon move outwardly, the particles enter a substantially annular volume of the separation chamber 74 wherein the axially upward velocity component of the gas/liquid mixture flow is greatly reduced, thereby allowing the separated particles to travel downwardly toward annular wall 72 substantially without resistance from the flowing gas/liquid mixture. The particles which collect on annular wall 72 then flow through drain tube 76 to be returned to the reservoir of pulping liquor 32. The gas/liquid mixture, now substantially free of droplets of mist and particles of foam, is drawn through the flow-straightening baffles 60, tube 56, and outlet 58 to the blower (not shown) to be delivered to a hood (not shown) to increase the pressure differential above a wire carrying a pulp mat (not shown). A valve 78 controls the flow of gas back to the intake of the blower.

FIG. 4 shows another exemplary mist eliminator, as taught in the '014 patent and with particular elements as described therein. In pertinent part, the mist eliminator or separator 50 comprises an elongated cylindrical housing 100 having as upstream inlet 102 and downstream outlet 104 provided at opposite ends along the longitudinal axis of the housing. The separator or mist eliminator is oriented vertically in the receptacle 30 of the pulp washer with the inlet of the housing spaced above the pulping liquor 32 level. The system boundaries for the separator 50 are depicted showing areas outside the separator including a receptacle drain in dashed lines.

At the upstream end of the housing, an air straightening baffle 106 is attached to the inside of the housing. Spaced above baffle 106 is a cyclonic flow inducing vane assembly 108 housed in cylindrical shroud 110, coaxial to the longitudinal axis of the housing. The vane assembly comprises a central rod 114 coaxial with the housing axis and secured to the rod and shroud are a pair of swirl imparting vanes 116,118 to impart a cyclonic swirling motion to the liquid/gas mixture traveling through the separator in an upstream to downstream direction from the inlet to the outlet. Fixed to the outside of the shroud 110 and inside of the housing 100 is an annular rim 120 which provides an air tight seal in the area between the shroud and inside wall of the housing. The rim 120 is inclined relative to the longitudinal axis of the housing. At the point on the rim closest to the liquor 32 level an opening 122 is provided to allow for drainage of liquid through drain tube 124 directly into the pulp liquor 32 at drain exit 126. A first cyclonic action zone 150 is provided in the cylindrical housing between the baffle 106 and the vane assembly 108, with a second cyclonic action zone 152 provided in the housing between the assembly 108 and the outlet 104. Location of the vane assembly 108 at a generally medial disposition within the housing provides a more elevated position than provided for the drain tube 76 in FIG. 3, increasing head pressure over the opening 122 to improve liquid drainage through tube 124.

In order to address ongoing problems of incomplete separation of air/liquid and drainage from existing mist eliminators, improvements using drainage of liquid from the mist eliminator to outside the receptacle overcome the head pressure problem, and new designs have been developed to enhance the initial air/liquid separation. It has been found that it is critical to separate any liquid from the airflow so it does not pass valve 78 after which point the airflow velocity is higher than upstream of the valve 78 and any remaining liquid will mist and be entrained in the air flow reaching the blower 256. It has also been found that air leakage into the receptacles under vacuum will increase the amount of foam which has concentrations of liquor constituents different from the liquid pulping liquor in the receptacle, and that removal of the separated liquid from the pulping liquor by draining separately may provide some benefits to the chemical recovery systems used. Thus, improvements to the initial gas/liquid separation can be used alone or in combination with separate drainage of the separated liquid to great effect.

Figure 5:
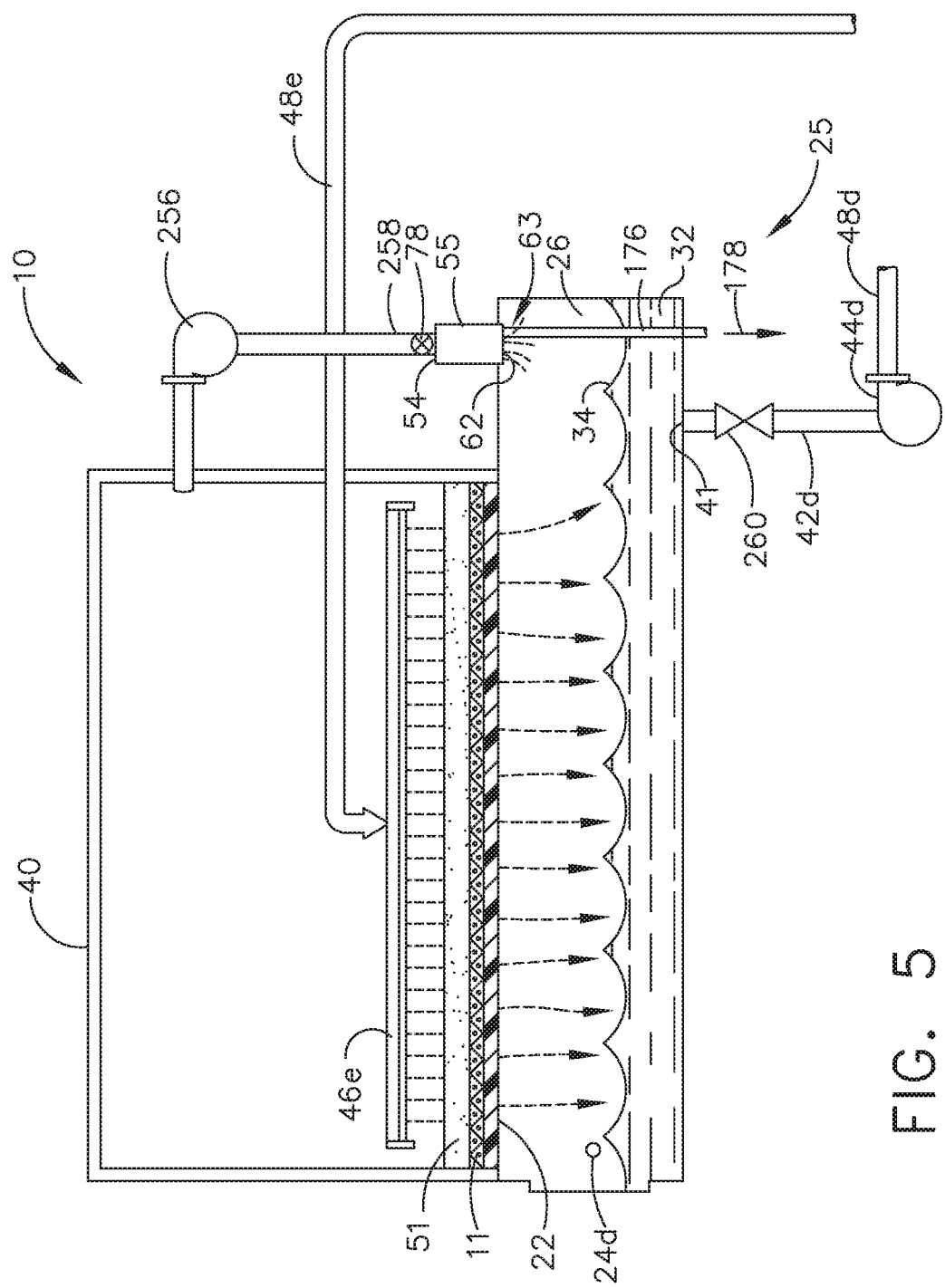
FIG. 5 is a cross-sectional view taken along the lines and arrows 2-2 of FIG. 1 showing a mist eliminator and foam remover system draining liquid outside the receptacle.

As shown in FIG. 5 an improved mist eliminator with a gas/liquid separator 55 is provided having a drain tube 176 extending outside and below a sump 25 of the receptacle 24d. By lowering the point at which separated liquid 178 exits drain tube 176 the tendency of the vacuum level within gas/liquid separator 55 to pull draining separated liquid 178 up into the mist eliminator above the drain level 75 may be overcome as the separated liquid 178 head has been increased. Overcoming the gas vacuum pull on separated liquid in drain tube 176 can be further enhanced by providing a liquid vacuum source to the separated liquid 178 as will be discussed below.

As shown more particularly in FIG. 6, an exemplary gas/liquid separator 55 with elements as previously shown and discussed with respect to the mist eliminator 50 of FIG. 3 is positioned proximate suction box 26 with drain tube 176 extending outside suction box 26. The gas/liquid separator 55 housing 52 has a wall extending around a generally longitudinally extending substantially vertical centerline 53 with a lower end 63 and an upper end 54 disposed at opposing ends of the housing, the lower end having a gas/liquid inlet 62 in flow communication with suction box 26 above the pulping liquor level 34 and the upper end having a gas outlet 58 in flow communication with the previously discussed blower 256 acting as a gas vacuum source. The separation chamber 74 is provided intermediate the lower end and the upper end with a chamber inlet 67 in flow communication through a cyclonic flow inducing vane assembly 64 and a housing 52 in such that in operation the gas vacuum source pulls gas through the gas/liquid separator 55. Airflow 80 including a mixture of gas and liquid enters the gas/liquid separator 55 through the gas/liquid inlet 62 and travels through vane assembly 64 which imparts a cyclonic flow to the gas/liquid flow as it enters separation chamber 74 through a chamber inlet 67 in a flow-wise direction not aligned with the direction is not aligned the liquid component to flow down a cylindrical wall 70 and annular wall 72 into drain 75 where it drains down through drain tube 176 outside of suction box 26 to enable a higher pressure head for drainage flow 178 than when previously drained into sump 25, and which may further be enhanced by a liquid vacuum source as discussed in examples below.

FIG. 7 shows another exemplary gas/liquid separator 55 with elements as previously shown and discussed with respect to the mist eliminator 50 of FIG. 4 and gas/liquid separator 55 of FIG. 6. In this example, a cyclonic flow inducing vane assembly 64 is provided intermediate along a longitudinally extending substantially vertical centerline 53 to define a first cyclonic separation zone 150 within housing 52 upstream from the vane assembly 64 and the separation chamber 74 is flow-wise downstream from the vane assembly 64 as a second cyclonic separation zone 152. Drain tube 176 extends through pulping liquor drain 41 into drain line 142d to drain tube end 272 located a sufficient distance into and aligned with flow of pulping liquor 32 through drain line 142d such that the pulping liquor flow will provide an additional draw, acting as a vacuum source enabling an eductor flow of separated liquid through drain tube end 272, thus enabling drain line 142d to act as an eductor pipe 238.

Figure 8:
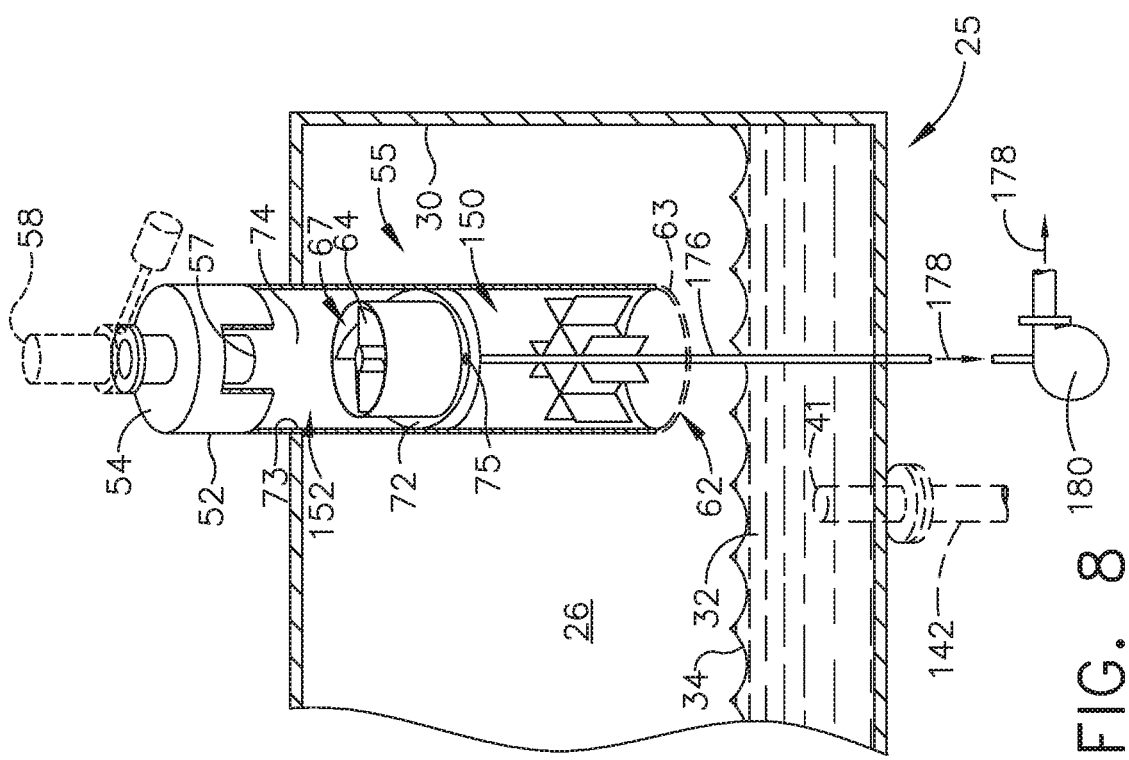
FIG. 8 is a partially broken away side elevational view of a mist eliminator and foam remover system with the liquid drain augmented by vacuum.

FIG. 8 shows another example of a gas/liquid separator 55 with elements as previously discussed with respect to FIG. 7 and Figures referenced therein, and further with drain tube 176 providing flow 178 to a liquid vacuum pump 180.

Drainage features outside the suction box 26 can be applied to any existing mist eliminator system used with an Ericsson type washer suction box, and a liquid vacuum source used to supplement drainage from a separated liquid drain may draw gas in addition to separated liquid through the associated drain tube. For example, while referred to herein as a liquid vacuum pump, reference to such vacuum pumps is not intended to be limited to pumps capable of pumping only liquid, but also pumps capable of pumping a combination of liquid and gas. A liquid vacuum source such as an eductor pipe, liquid vacuum pump, or other source to enhance flow of separated liquid out of a liquid gas separator can be used to prevent the upward gas vacuum flow within the liquid/gas separator from drawing liquid upward through the separated liquid drain.

While FIGS. 5-8 show modifications to existing mist eliminator systems that initially use an upflow of gas/liquid into the gas/liquid separator with drainage of separated liquid from a pulp washer suction box to outside the suction box, FIGS. 9-15 show gas/liquid separator systems using a tangential or side entry of gas/liquid flow that may be drained inside or outside the suction box.

Figure 9:
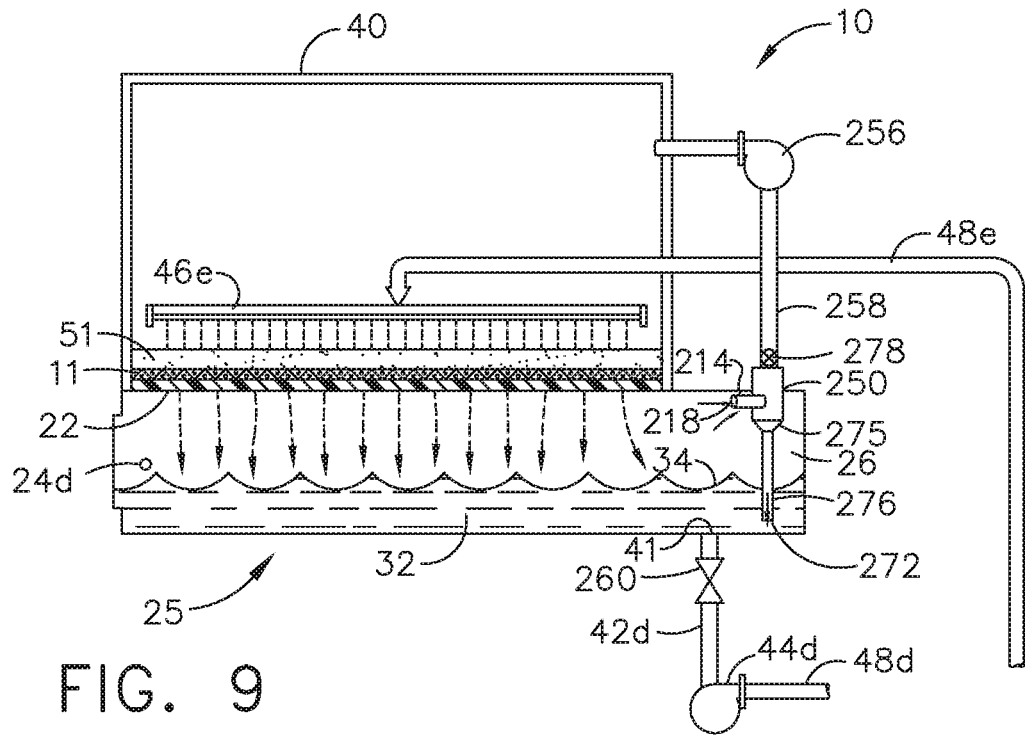
FIG. 9 is a cross-sectional view taken along the lines and arrows 2-2 of FIG. 1 showing a mist eliminator and foam removal system having a tangential entry.

FIG. 9 shows a mist eliminator and foam removal system having a gas/liquid separator 250 with a tangential or side entry of gas/liquid from suction box 26 through gas/liquid inlet 218 and flow passage 214 into the gas/liquid separator 250 with separated liquid draining through drain 275 and drain tube 276 into pulping liquor 32 within sump 25. Improvements provided by a side or tangential entry can enable much better separations than upflow gas/liquid separators.

Figure 10:
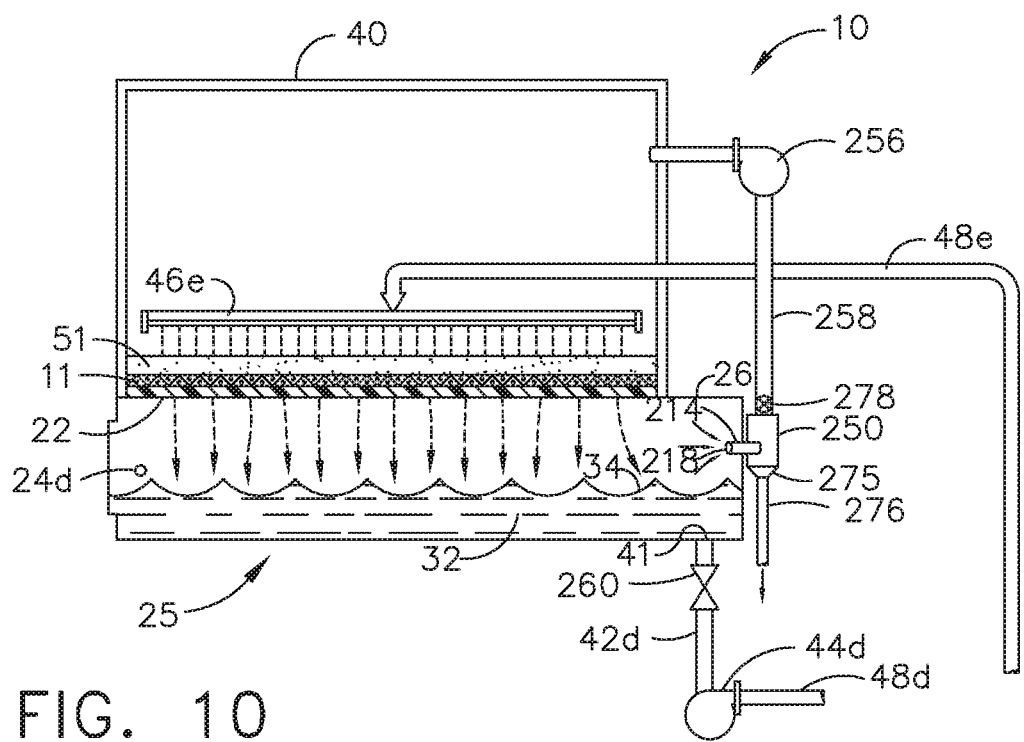
FIG. 10 is a cross-sectional view taken along the lines and arrows 2-2 of FIG. 1 showing a mist eliminator and foam removal system having a tangential entry and drain outside the receptacle.

FIG. 10 shows a mist eliminator and foam removal system having a gas/liquid separator 250 with a tangential or side entry of gas/liquid from suction box 26 through gas/liquid inlet 218 located within the suction box 26 and having flow passage 214 into the gas/liquid separator 250 outside the suction box 26, with separated liquid draining through drain 275 and drain tube 276 outside the suction box 26.

FIGS. 11 through 15 show embodiments of mist eliminator and foam removal systems having features that may be used alone or in combination with the exemplary embodiments of FIGS. 9 and 10. The features provided can be used with gas/liquid separators located inside, partially inside, or outside the suction box provided a gas/liquid inlet is in flow communication with the suction box.

Figure 11:
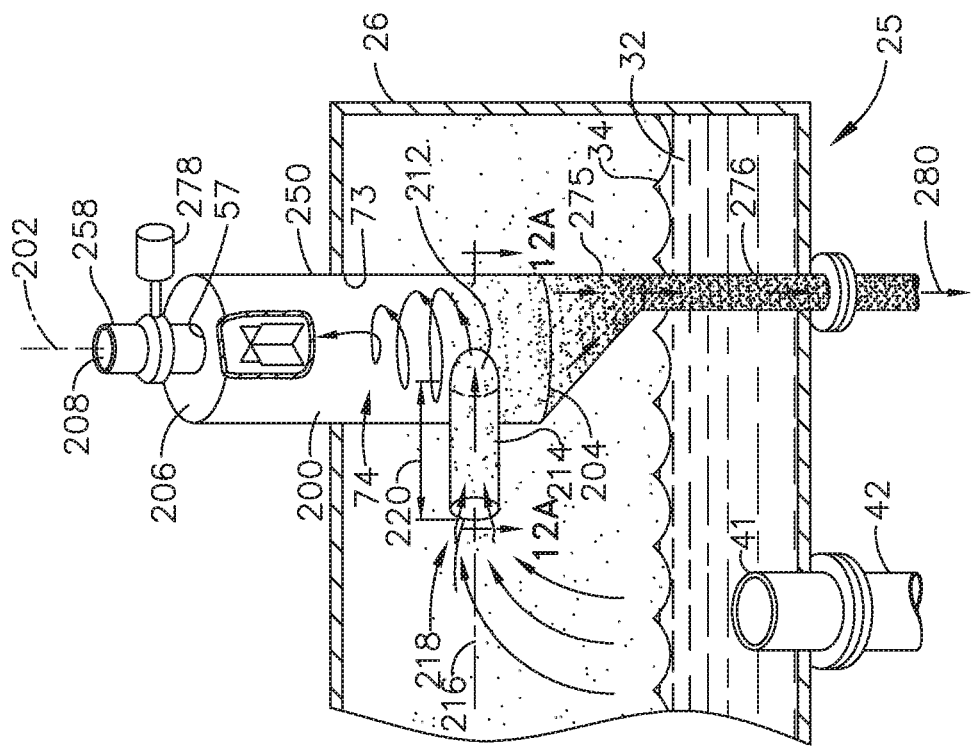
FIG. 11 is a view in side elevation of an embodiment of a mist eliminator and foam removal system having a tangential entry.

FIG. 11 shows an embodiment of side or tangential mist eliminator system with a gas/liquid separator 250 having a housing 200 with wall extending around a generally longitudinally extending substantially vertical centerline 202, and having a lower end 204 and an upper end 206 disposed at opposing ends of the housing, with a the upper end adapted to provide a gas flow outlet 208 to a return line 258 extending from a control valve 278. Housing 200 has a flow inlet 212 to a separation chamber 74 having a chamber wall 73 intermediate the lower end 204 and the upper end 206, the chamber inlet 212 connected to a flow passage 214 aligned along centerline 216 outward to a gas/liquid inlet 218, the centerline 216 oriented substantially traverse to an offset from vertical centerline 202 and having a distance 220 sufficient to straighten a suction flow of gas/liquid prior to passing through the chamber inlet 212. Suction provided by the gas vacuum source 256 (not shown here) will induce a gas/liquid flow entering the separation chamber 74 with entrained liquid constituents of mist or foam having a velocity and momentum causing impingement on the chamber wall 73 such that the liquid will coalesce into droplets and drain down the wall towards the lower end 204 while the gas flow is better able to turn and move upward to gas outlet 208. As shown more clearly in FIG. 12A, this side entry provides a more direct impingement on chamber wall 73 than conventional cyclonic separators which had a much more substantial comparative upward velocity. The coalesced separated liquid 280 will flow toward lower end 204 and through drain 275 into drain tube 276 and can be returned to pulping liquor 32 within sump 25 as in FIG. 10, or may be drained outside the pulp washer for further processing, or mixed with pulping liquor outside the sump 25.

FIG. 11A through FIG. 11E show various embodiments of a gas/liquid separator 250 with various flow passage considerations to show variations of shapes, contours, blockages, angle of entry, and internal enhancements that are within the scope of the invention, and which may be used alone or in combination.

Figure 11D:
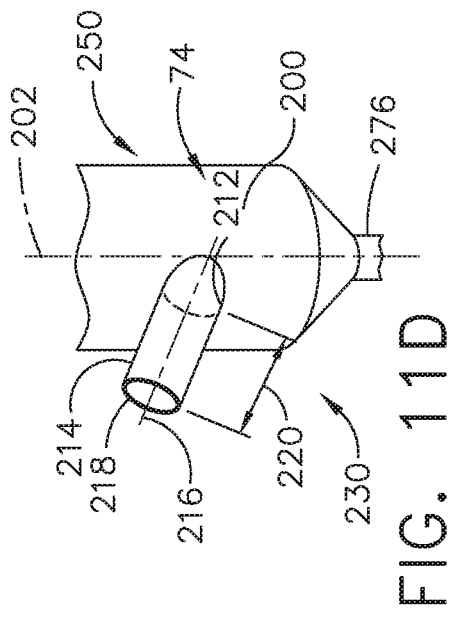
FIG. 11D is a perspective view of a mist eliminator and foam removal system with a canted tangential entry.
Figure 11E:
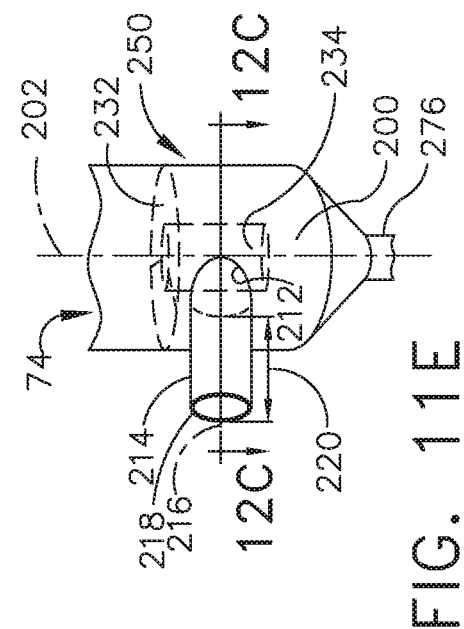
FIG. 11E is a perspective view of a mist eliminator and foam removal system having a tangential entry and internal structure to continue guiding the flow within the system after entry.
Figure 11A:
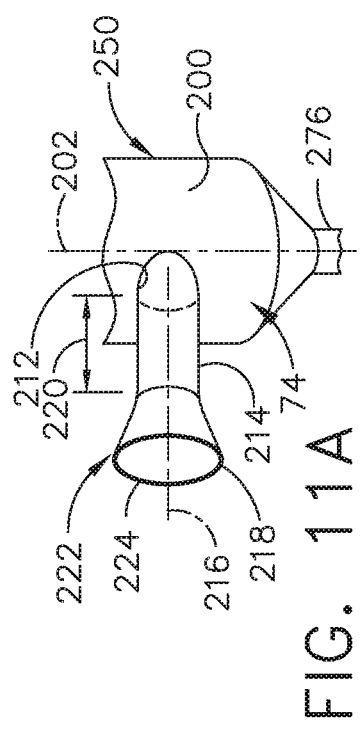
FIG. 11A is a perspective view of a mist eliminator and foam removal system with the tangential entry having a transitory section with a larger entrance than the cross-section perpendicular to the internal flow direction.
Figure 12A:
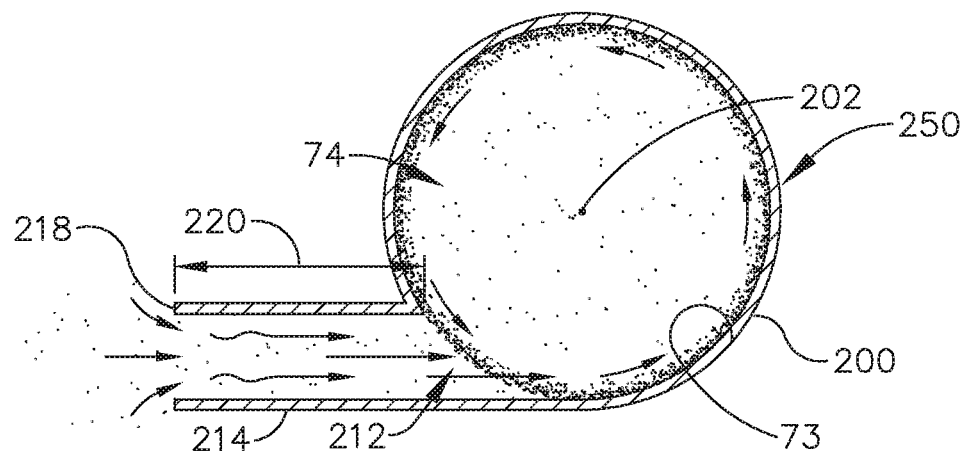
FIG. 12A is a cross-sectional view of a mist eliminator and foam removal system looking downward along the lines 12-12 of FIG. 11.

FIG. 11A shows a flow passage 224 with a flow passage inlet 218 having a bell mouth shape 222, wherein the passage entry 224 is larger than the cross-sectional area of flow passage 214. Centerline 216 is substantially perpendicular to the housing vertical centerline 202, and a flow straightening length 220 is provided such that gas/liquid flow entering the gas/liquid separator through chamber inlet 212 will be directed in a flow-wise direction substantially perpendicular to the housing vertical centerline 202 and liquid particles will impinge on the chamber wall 73 (such as shown in FIG. 12A) and coalesce into droplets that travel downward by the force of gravity towards the separated liquid drain 175.

Figure 11B:
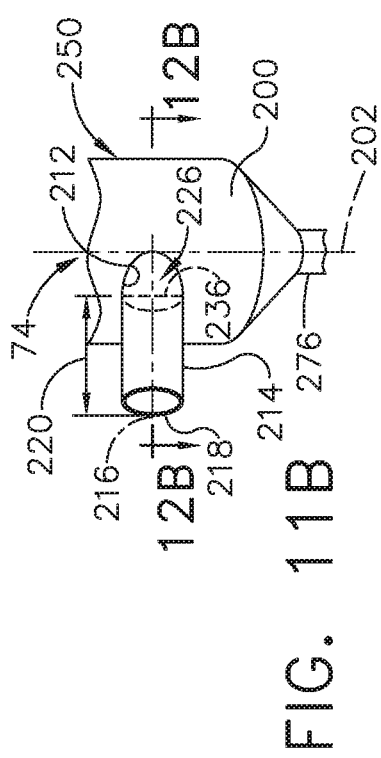
FIG. 11B is a perspective view of mist eliminator and foam removal system with the tangential entry entrance into a vertical section smaller than the cross-section perpendicular to the internal flow direction.

FIG. 11B shows a portion of the chamber inlet 212 blocked with respect to the full cross-sectional area of the passage, with cross section 12B-12B providing further detail.

Figure 11C:
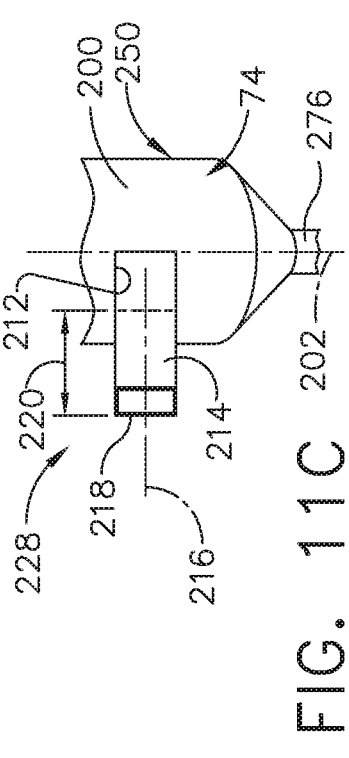
FIG. 11C is a perspective view of a mist eliminator and foam removal system with the tangential entry having a rectangular cross-section with respect to the internal flow direction.

FIG. 11C shows a rectangular flow passage 214. A rectangular flow passage intersecting a cylindrical housing will provide a more uniform tangential flow entry into separation chamber 74 than a circular passage.

FIG. 11D shows a flow passage 214 having a slope canted downward in the flow-wise direction.

FIG. 11E depicts an annular wall 232 extending circumferentially inward from the housing above the flow inlet 212 extending circumferentially less than one full rotation and also shows and internal cylinder 234 extending downward from the annular wall 232 such that gas/liquid flow entering the separation chamber 74 will be imparted and retain a substantially cyclonic flow element before entering the larger cross sectional area without the annular wall 232, at which point the tangential velocity will decrease as the gas/liquid flow upward velocity increases and moves upward towards the gas outlet 218.

FIG. 12A shows a cross-sectional view a gas/liquid separator 250 looking downward along arrows 12-12 FIG. 11, depicting the flow straightening effect through the length 220 of flow passage 214. As can be seen, the internally tangential flow will cause entrained liquid particles to impinge on housing 200 while the total airflow will have a cyclonic effect by being introduced into a cylindrical housing offset from the centerline and at the transverse angle rather than having any vertical flow component on chamber entry.

Figure 12B:
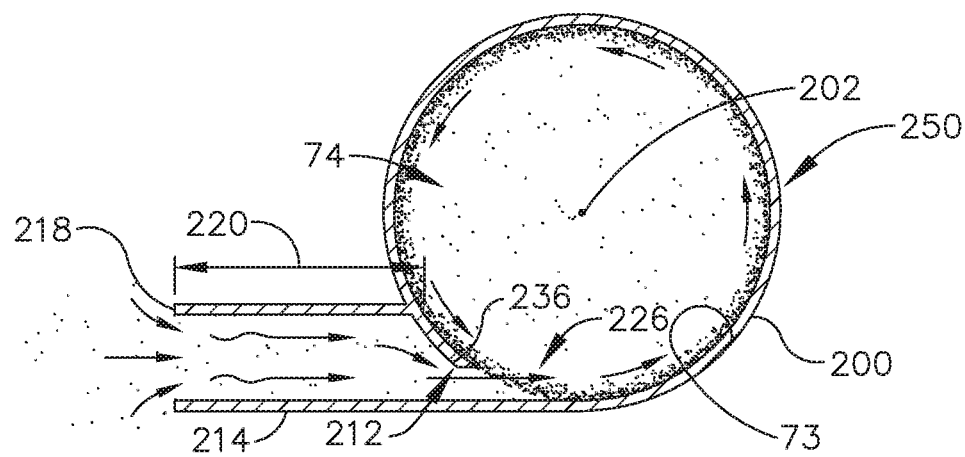
FIG. 12B is a cross-sectional view of a mist eliminator and foam removal system looking downward along the lines 12B-12B of FIG. 11B.

FIG. 12B is a cross-sectional view of a gas/liquid separator 250 looking downward along arrows 12B-12B of FIG. 11B. Considering both views can be seen there is a D-shaped flow inlet 212 which based on the larger flow passage cross-section in conjunction with the curvature of the cylindrical housing 200 will provide an even higher impingement of liquid particles based on their velocity and momentum.

Figure 12C:
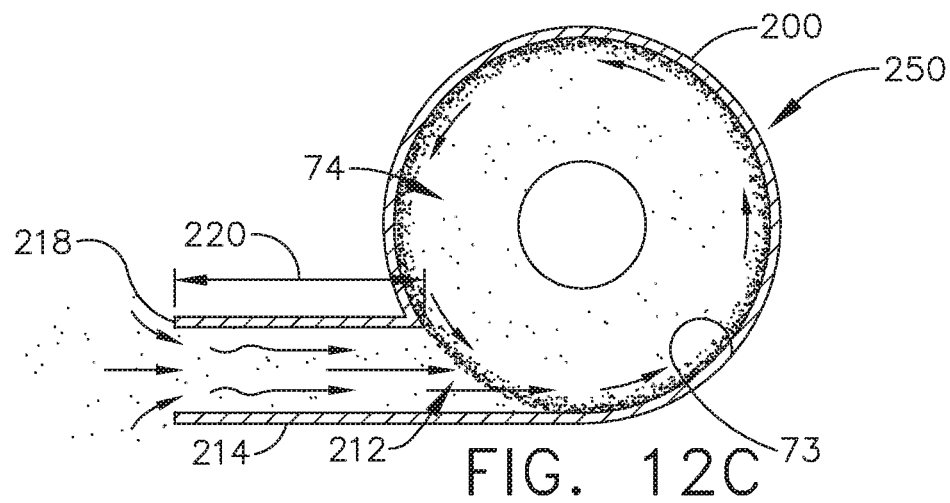
FIG. 12C is a cross-sectional view of a mist eliminator and foam removal system looking downward along the lines 12C-12C of FIG. 11E

FIG. 12C is a cross-sectional view of a gas/liquid separator 250 looking downward along the lines 12C-12C of FIG. 11E showing a cyclonic enhancement of flow by addition of an internal cylinder.

FIG. 13 shows an embodiment of side or tangential mist eliminator system with a gas/liquid separator 250 having a drain connected to a vacuum source, in this case a liquid pump 282. Foam 286 is depicted with a foam level 284 showing that the foam level can reach the gas/liquid inlet 218 and chamber inlet 212.

FIG. 14 depicts an embodiment of a side or tangential mist eliminator system with a gas/liquid separator 250 having a drain augmented by an eductor 238 with drain tube 276 schematically shown entering the pipe and having tube end 272 aligned with the flow in the eductor pipe 238 to enable a suction force pulling a flow of liquid 240 from tube end 272. The eductor pipe 238 could be carrying any liquid flow ("liquid" as used in this context could include a gas containing liquid flow), such as the liquor being provided to the upstream shower head (either by placement of the tube end 272 in drain line 42,142 or return line 48) or a flow of liquid which could include separated liquid from other gas/liquid separators and which could be removed from the counter-current pulp washer for further processing and/or chemical recovery. It is anticipated some recovery systems could obtain tall oil and/or other chemicals that may be more concentrated in a separated liquid than in the associated receptacle's liquor.

Figure 15:
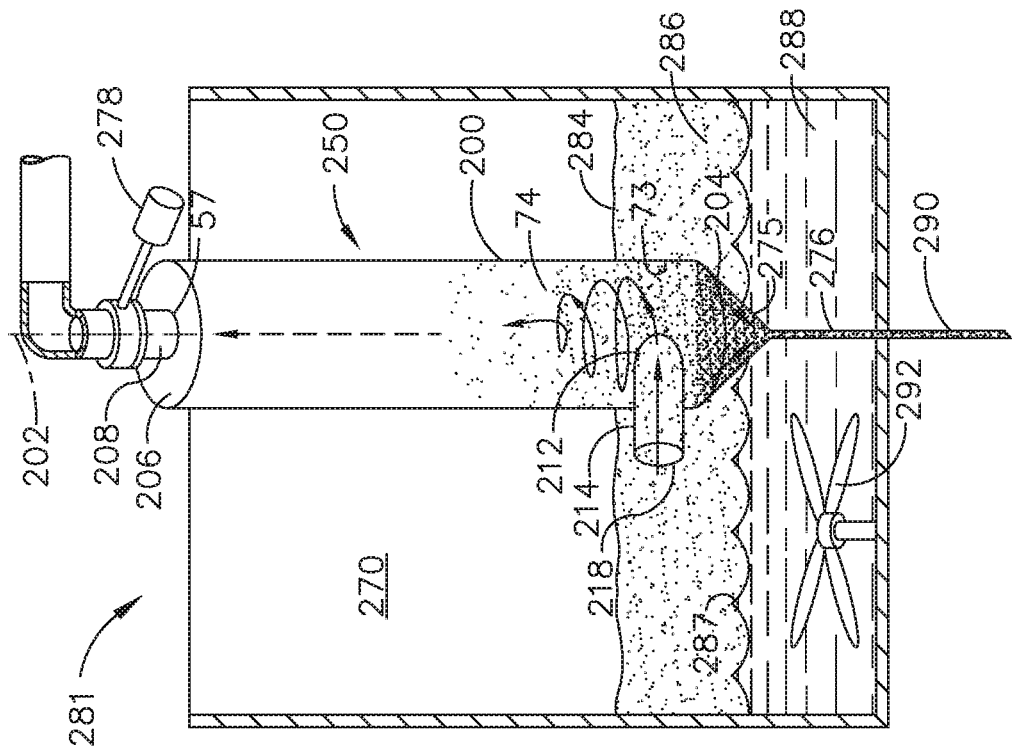
FIG. 15 is a view in side elevation of an embodiment of a tangential entry mist eliminator and foam removal system having a drain augmented by an eductor in a pipe draining the receptacle.

FIG. 15 shows an embodiment of side or tangential mist eliminator system with a gas/liquid separator 250 having drainage through drain tube 276 augmented by its insertion in drain line 42 with drain tube end 272 aligned with the pulping liquor drain line 42 to act as an eductor pipe 238 drawing separated liquid flow 240 from drain tube end 272. This arrangement could provide the conventional pulping liquor mix available from one receptacle to the upstream showerheads.

In both upflow and tangential/side entry embodiments of gas/liquid separators discussed above with respect to FIGS. 5-15, separated liquid flow 178, 240 can be placed in an independent eductor pipe 238 as discussed above and taken out of the system as appropriate for further processing or disposal based on the chemical content of the separated liquid which is anticipated to be different from the corresponding pulping liquor due to it resulting from separation of foam and liquid particles that were entrained in the air above the pulping liquor level 34. A gas/liquid separator could be used with a single receptacle and its associated washing zone, or more than one up to all the receptacles could have an associated gas/liquid separator.

Figure 16:
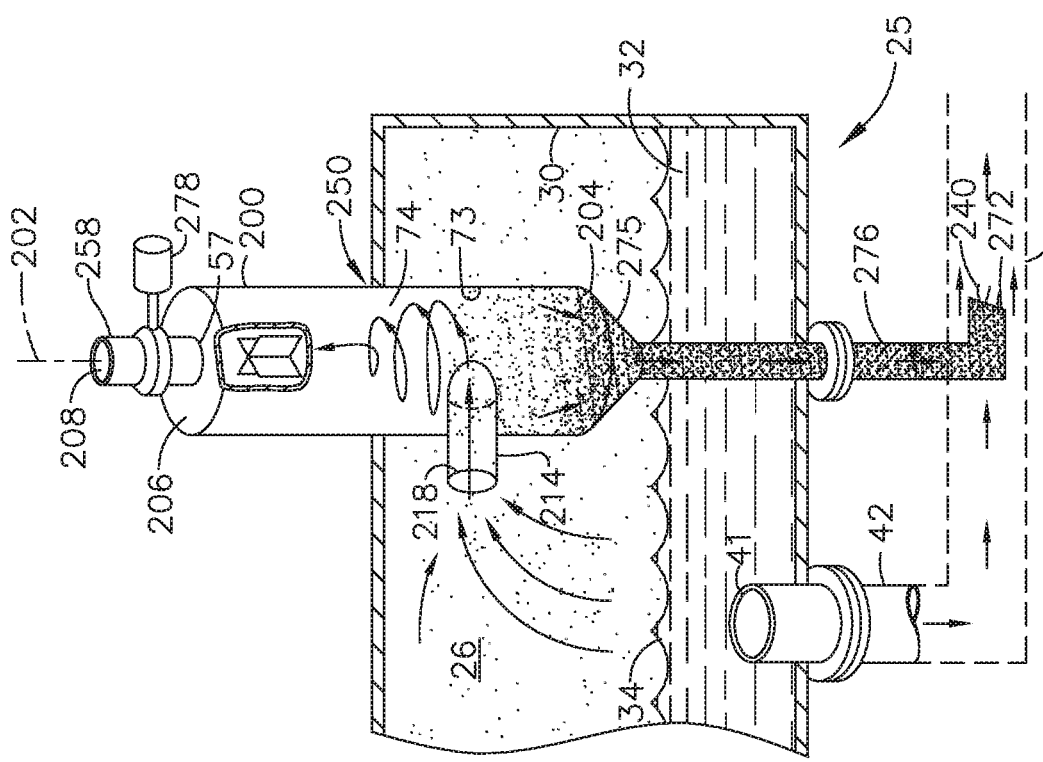
FIG. 16 is a diagrammatic view illustrating use of a mist eliminator and foam removal system in a recycle pulp deinking cell.

FIG. 16 is a diagrammatic view illustrating the use of a mist eliminator and foam removal system gas/liquid separator, as described above for use in a pulp washer, in a recycle pulp deinking cell 270. The deinking cell 270 shown has a receptacle 281 open to the atmosphere and has an agitator 292 that agitates a recycle pulp slurry 288 promoting air bubble formation, wherein ink particles are floated in the form of a dense foaming mass 286 above a pulp slurry level 287 and having a foam level 284. While a gas/liquid separator with a tangential/side entry is shown, any of the gas/liquid separators 55, 250 described herein with respect to pulp washers could be used in a deinking cell with drain tube 176, 276 extending outside the receptacle 281 to remove ink particles from the system, and reference numerals provided in the description below refer to the analogous elements as described above with respect to pulp washer systems.

More generally, a gas/liquid separator 250 having a gas outlet 58,208 in flow communication with a gas vacuum source 256 is positioned proximate the receptacle and has a gas/liquid inlet 62,218 located such that in operation the gas/liquid inlet is in direct contact and flow communication with the foamy mass whereby in operation the gas vacuum source pulls gas through the gas/liquid separator to draw foam from the foamy mass into the gas/liquid separator. The gas/liquid separator has a housing 52, 200 with a wall extending around a generally longitudinally extending substantially vertical centerline 53, 202 and having a lower end 63,204 and an upper end 54, 206 disposed at opposing ends of the housing, the upper end adapted to provide the gas outlet 58,208. A separation chamber 74 is located intermediate the lower end and the upper end, with a chamber inlet 67,212 in flow communication through a flow director 64,214 to the gas/liquid inlet 62,218. The separation chamber 74 and an outlet 57 in flow communication with the gas outlet 58,208, and has a chamber wall 73 substantially aligned with the housing centerline 53,202. The flow director is adapted to provide a flow through the chamber inlet in a flow-wise direction not aligned with the housing centerline 53,202. A separated liquid drain 75, 275 having a drain tube 176, 276 extends from the housing to a drain tube end 272 outside the receptacle 281. In operation the gas vacuum source draws foam from the receptacle through the separation chamber inlet 67, 212 in a flow-wise direction not aligned with the housing centerline such that entrained liquid particles and ink particles have a velocity and a momentum causing impingement on the chamber wall 73 whereby the particles coalesce into ink containing liquid droplets that travel downward by the force of gravity towards the separated liquid drain 75,175 which has a drain tube 176,276 extending outside the receptacle to a liquid vacuum source, not shown in FIG. 16.

The deinking cell gas/liquid separator can be of the upflow variety described with respect to FIGS. 6 and 8 or it can be of the tangential or side entry variety described with respect to FIGS. 11-14 with embodiments drained outside the suction box 26, which is analogous to receptacle 281. Features described with respect to these figures can be incorporated, alone or in combination.

While the present invention has been illustrated by a description of various embodiments and while these embodiments have been described in some detail, it should be understood that the invention is not limited to any embodiment described herein or illustrated in the drawings. Various features of the invention may be used alone or in any combination depending on the needs and preferences of the user. It should also be understood that the phraseology and terminology employed above are for the purpose of describing the illustrated embodiments, and do not necessarily serve as limitations to the scope of the invention. Therefore, the scope of the invention is to be limited only by the following claims.

What is claimed is:

1. A pulp washer having a horizontally disposed endless wire with drive rolls for moving said wire in an upstream to downstream direction, a headbox for feeding a pulp suspension containing dissolved solids to an upstream location on said wire, a suction box having a receptacle underlying said wire, said receptacle having a sump for holding pulping liquor received into said suction box during operation and a sump drain, wherein during operation said pulping liquor has a pulping liquor level within the receptacle, said pulp washer further having liquid showerheads positioned over said wire for directing in operation a liquid shower over said wire and said pulp to wash dissolved solids from said pulp whereby in operation at least some of said liquid with dissolved solids will drain into said suction box receptacle as said pulping liquor, said pulp washer further comprising:

a gas/liquid separator positioned proximate said suction box and having a gas/liquid inlet located in flow communication with said suction box above said pulping liquor level and a gas outlet in flow communication with a gas vacuum source such that in operation said gas vacuum source pulls gas through said gas/liquid separator from said suction box providing a suction under said wire to augment flow of liquid through said wire to said suction box receptacle with gas from above said wire at a higher pressure than gas below said wire; said gas/liquid separator further comprising:

a housing having a wall extending around a generally longitudinally extending substantially vertical centerline with a lower end and an upper end disposed at opposing ends of said housing, said upper end adapted to provide said gas outlet;

a separation chamber intermediate said lower end and said upper end, said separation chamber having a chamber inlet in flow communication through a flow director with said gas/liquid inlet and having a chamber outlet in flow communication with said gas outlet, said separation chamber further having a chamber wall substantially aligned with said housing centerline, said flow director adapted to provide a flow through said chamber inlet in a flow-wise direction not aligned with said housing centerline; and a separated liquid drain having a drain tube extending from said housing directly to a drain tube end outside said suction box such that separated liquid does not re-enter the pulping liquor within the receptacle sump;

wherein in operation said gas vacuum source draws a mixture of gas and liquid particles from said suction box through said separation chamber inlet in said flow-wise direction not aligned with said housing centerline such that entrained particles have a velocity and a momentum causing impingement on said chamber wall whereby the particles coalesce into droplets that travel downward by the force of gravity towards the separated liquid drain.

2. The pulp washer of claim 1 wherein said housing comprises a generally cylindrical housing having said gas/liquid inlet located at said housing lower end such that said mixture of gas and liquid particles is drawn upward through said gas/liquid separator from said lower end, said gas/liquid separator further comprising:

said flow director comprising a cyclonic flow inducing vane assembly having a helical vane bounded by a cylindrical wall positioned along said longitudinally extending substantially vertical centerline within said housing;

an annular wall positioned transverse to said vane assembly and disposed between said vane assembly and said housing, said annular wall inclined from said centerline to a low point with said separated liquid drain in communication with said separation chamber.

3. The pulp washer of claim 2 wherein said cyclonic flow inducing vane assembly intermediate position along said longitudinally extending substantially vertical centerline defines a first cyclonic separation zone within said housing upstream from said vane assembly and said separation chamber is downstream from said vane assembly as a second cyclonic separation zone.

4. The pulp washer of claim 1 wherein said gas/liquid separator housing lower end is adapted to provide an outlet for separated liquid through said separated liquid drain to said drain tube, said gas/liquid separator further comprising:

said separation chamber inlet formed in said housing wall with said flow director comprising a flow passage having a centerline oriented substantially transverse to and offset from said vertical centerline, said flow passage extending outward from said housing, and having a flow straightening length from a flow passage inlet to said separation chamber inlet.

5. The pulp washer of claim 1 further comprising said drain tube extending to a liquid vacuum source configured to control the degree of liquid vacuum developed by the liquid vacuum source such that during operation a gas pressure vacuum within said separation chamber is insufficient to draw liquid upward from the separated liquid drain.

6. The pulp washer of claim 5 wherein a sump drain line extends from receptacle for draining pulping liquor and wherein said drain tube extends within said drain line and has tube end aligned with pulping liquor flow in said drain line such that said liquid vacuum source is provided by flow through the drain line inducing flow from said drain tube.

7. The pulp washer of claim 5 wherein said liquid vacuum source is a liquid vacuum pump.

8. A method for separating liquids existing in a gas stream in a counter-current pulp washer of the type having a suction box comprising a receptacle with a reservoir of a pulping liquor disposed therein that is used to supply upstream showerheads for displacement washing pulp, said method comprising:

providing a gas/liquid separator proximate to said suction box receptacle, said gas/liquid separator having a housing disposed above said liquid level, said housing having a wall extending around a generally longitudinally extending substantially vertical centerline with a lower end and an upper end disposed at opposing ends of said housing; said upper end adapted to provide a gas outlet in flow communication with a gas vacuum source; a separation chamber having a chamber inlet in flow communication with a gas/liquid inlet to said gas/liquid separator from said suction box receptacle and a chamber outlet in flow communication with said gas outlet, said separation chamber further having a chamber wall substantially aligned with said centerline and a flow director providing flow entering said separation chamber in a direction not parallel to said vertical centerline; a separated liquid drain having a drain tube extending from said housing directly to a drain tube end outside said suction box;

drawing a suction from said gas vacuum source to draw a mixture of gas and liquid particles from said suction box through said separation chamber inlet in a flow-wise direction not aligned with said centerline such that entrained particles have a velocity and a momentum causing impingement on said chamber wall where the particles coalesce into droplets of separated liquid that travel downward by the force of gravity towards said separated liquid drain; and draining separated liquid through said drain tube outside said receptacle such that separated liquid does not re-enter the pulping liquor within the receptacle sump and such that a gas vacuum within said housing is insufficient to draw separated liquid upward above said separated liquid drain.

9. The method of claim 8 further comprising providing a liquid vacuum source to said drain tube end.

10. The method of claim 9 further comprising aligning the exit at said drain tube end in an eductor pipe in the direction of flow within said eductor pipe and drawing said separated liquid through said drain tube by flowing liquid through said eductor pipe to provide said liquid vacuum source inducing flow from said drain tube end.

11. The method of claim 8 further comprising removing said separated liquid from said counter-current pulp washer for further processing.

12. A pulp washer having a horizontally disposed endless wire with drive rolls for moving said wire in an upstream to downstream direction, a headbox for feeding a pulp suspension containing dissolved solids to an upstream location on said wire, a suction box having a receptacle underlying said wire, said receptacle having a sump for holding pulping liquor received into said suction box during operation and a sump drain, wherein during operation said pulping liquor has a pulping liquor level within the receptacle, said pulp washer further having liquid showerheads positioned over said wire for directing in operation a liquid shower over said wire and said pulp to wash dissolved solids from said pulp whereby in operation at least some of said liquid with dissolved solids will drain into said suction box receptacle as said pulping liquor, said pulp washer further comprising:

a gas/liquid separator positioned proximate said suction box and having a gas/liquid inlet located in flow communication with said suction box above said pulping liquor level and a gas outlet in flow communication with a gas vacuum source such that in operation said gas vacuum source pulls gas through said gas/liquid separator from said suction box providing a suction under said wire to augment flow of liquid through said wire to said suction box receptacle with gas from above said wire at a higher pressure than gas below said wire; said gas/liquid separator further comprising:

a housing having a wall extending around a generally longitudinally extending substantially vertical centerline with a lower end and an upper end disposed at opposing ends of said housing, said lower end having a separated liquid drain with a drain tube extending from said housing directly to a drain tube end outside said suction box such that separated liquid does not re-enter the pulping liquor within the receptacle sump and said upper end adapted to provide said gas outlet; and a separation chamber intermediate said lower end and said upper end having a chamber wall substantially aligned with said housing centerline and internal to said housing wall, a chamber inlet formed in said housing wall with a flow passage having a centerline oriented substantially transverse to and offset from said vertical centerline, said flow passage extending outward from said chamber inlet to said gas/liquid inlet.

13. The pulp washer of claim 12 wherein said flow passage comprises a flow passage inlet with an entry having a cross-sectional area larger than said flow passage and in a bellmouth shape.

14. The pulp washer of claim 12 wherein said chamber flow inlet is provided with a cross sectional area smaller than a cross sectional area of said flow passage.

15. The pulp washer of claim 12 wherein said flow passage has a rectangular cross section.

16. The pulp washer of claim 12 wherein said flow passage is canted downward in the direction of flow through said flow passage.

17. The pulp washer of claim 12 wherein said gas/liquid separator further comprises an annular wall extending circumferentially inward from said housing above said flow inlet to an inner cylinder extending downward from said annular wall, said annular wall extending from said flow inlet less than one full rotation circumferentially whereby in operation the gas/liquid flow entering said gas/liquid separator is imparted a cyclonic flow with liquid particles in said gas/liquid flow have a velocity and momentum causing impingement on said chamber wall whereby the particles coalesce into droplets of separated liquid that travel downward by the force of gravity as the gas/liquid flow enters a larger cross sectional area where the tangential velocity of the gas/liquid flow will decrease and a separated gas flow moves upward towards said gas outlet.

\* \* \* \* \*